April 4, 1967   J. W. GREENLEAF, JR   3,312,348
MULTIPLE UNIT BACKWASHING GRAVITY FLOW FILTER
Filed Oct. 31, 1963

INVENTOR,
JOHN W. GREENLEAF, JR.

BY
Watson, Cole, Grindle & Watson
ATTORNEYS

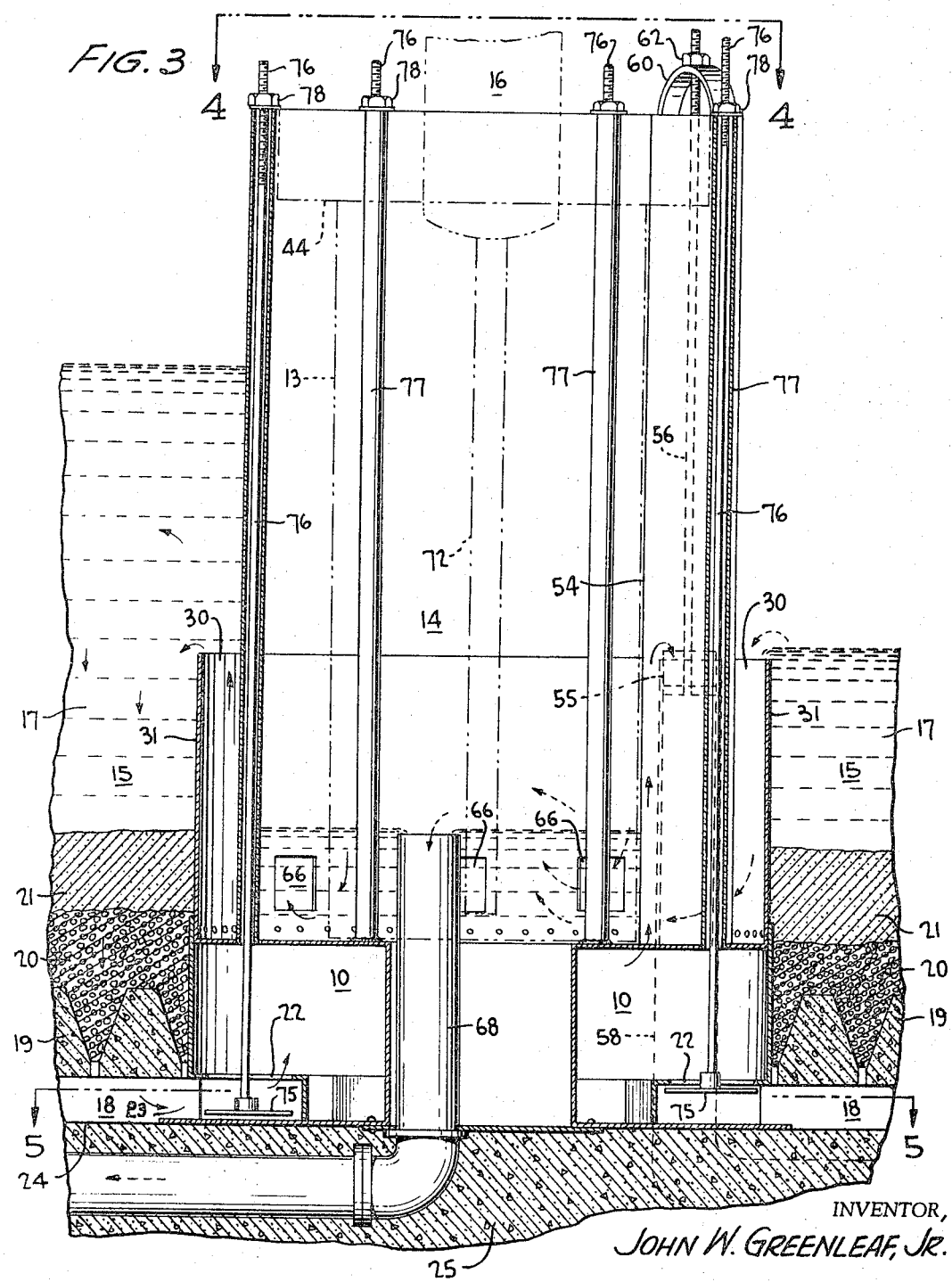

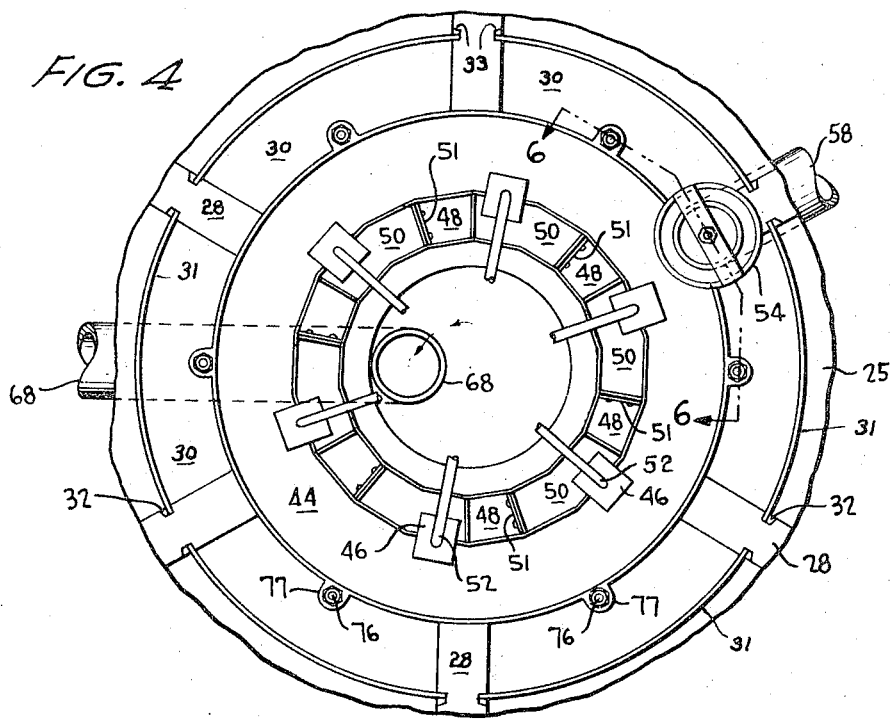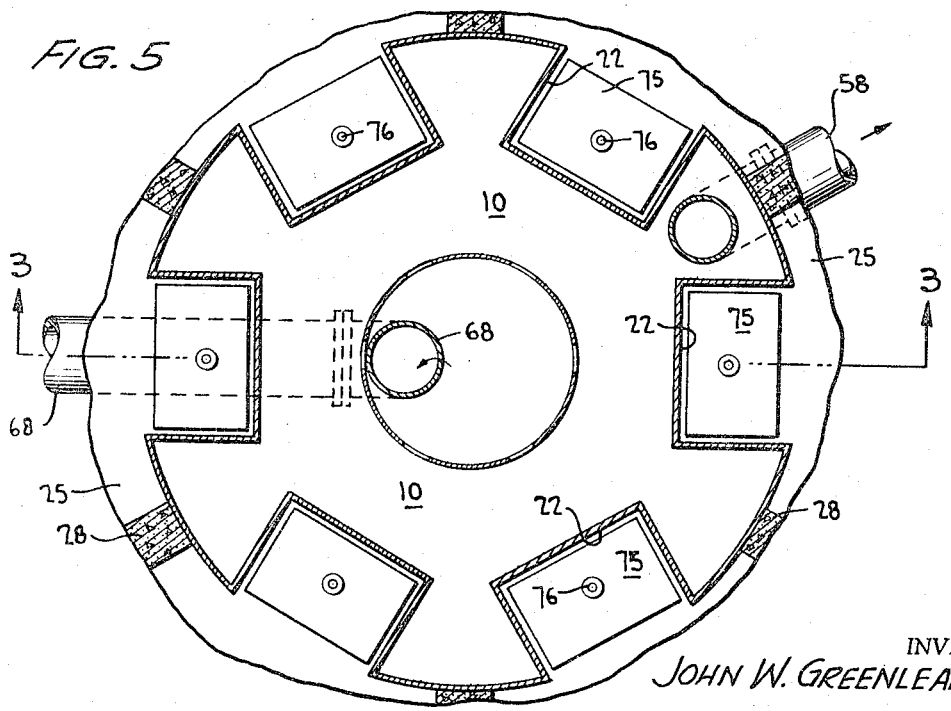

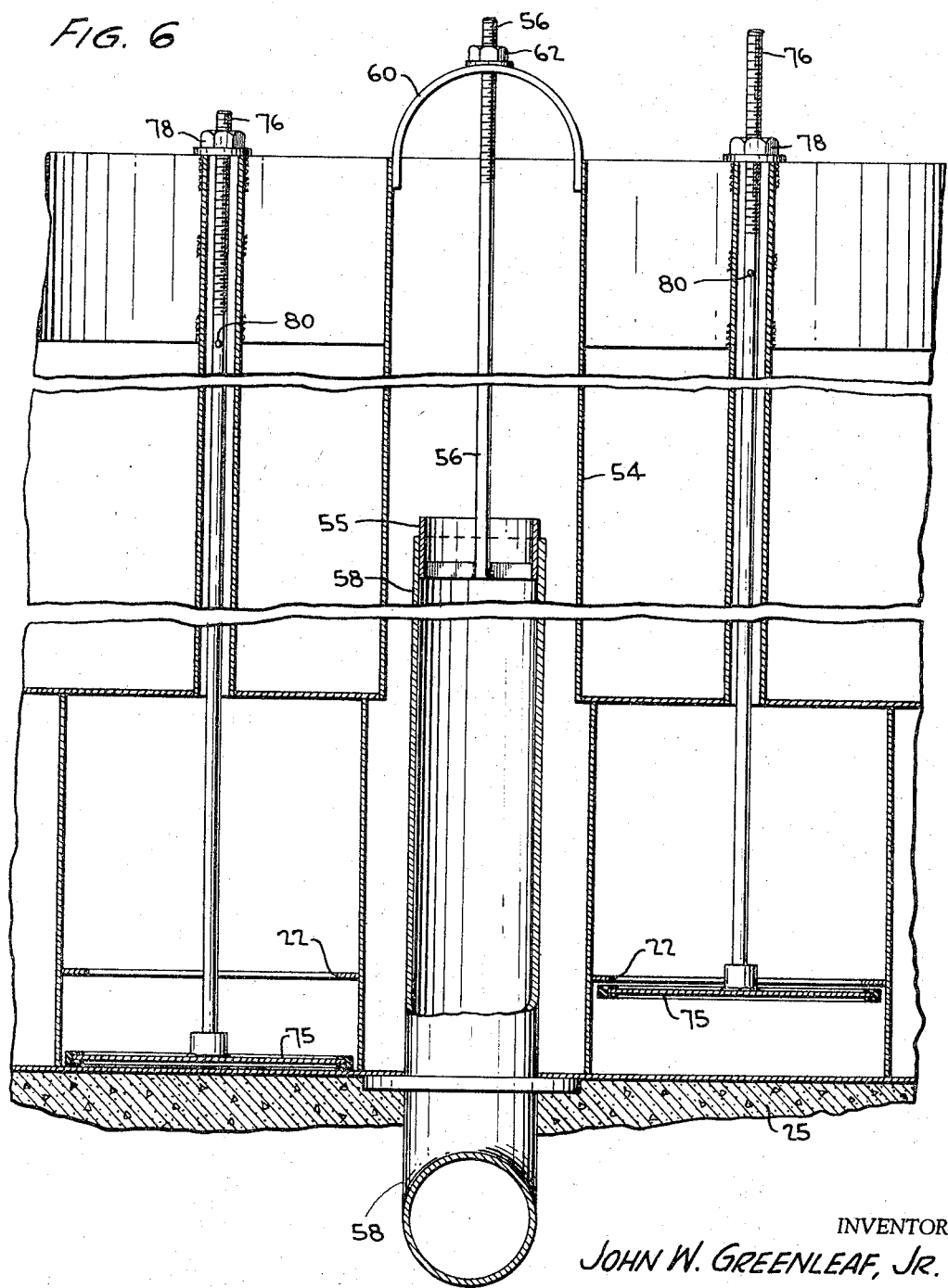

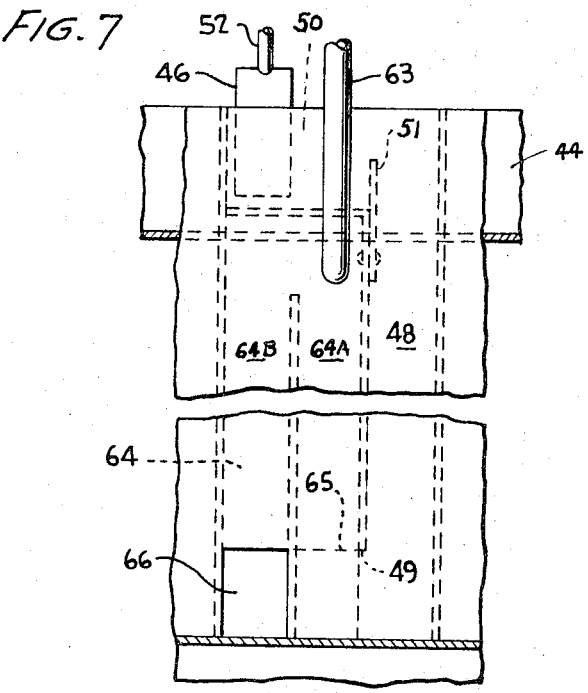

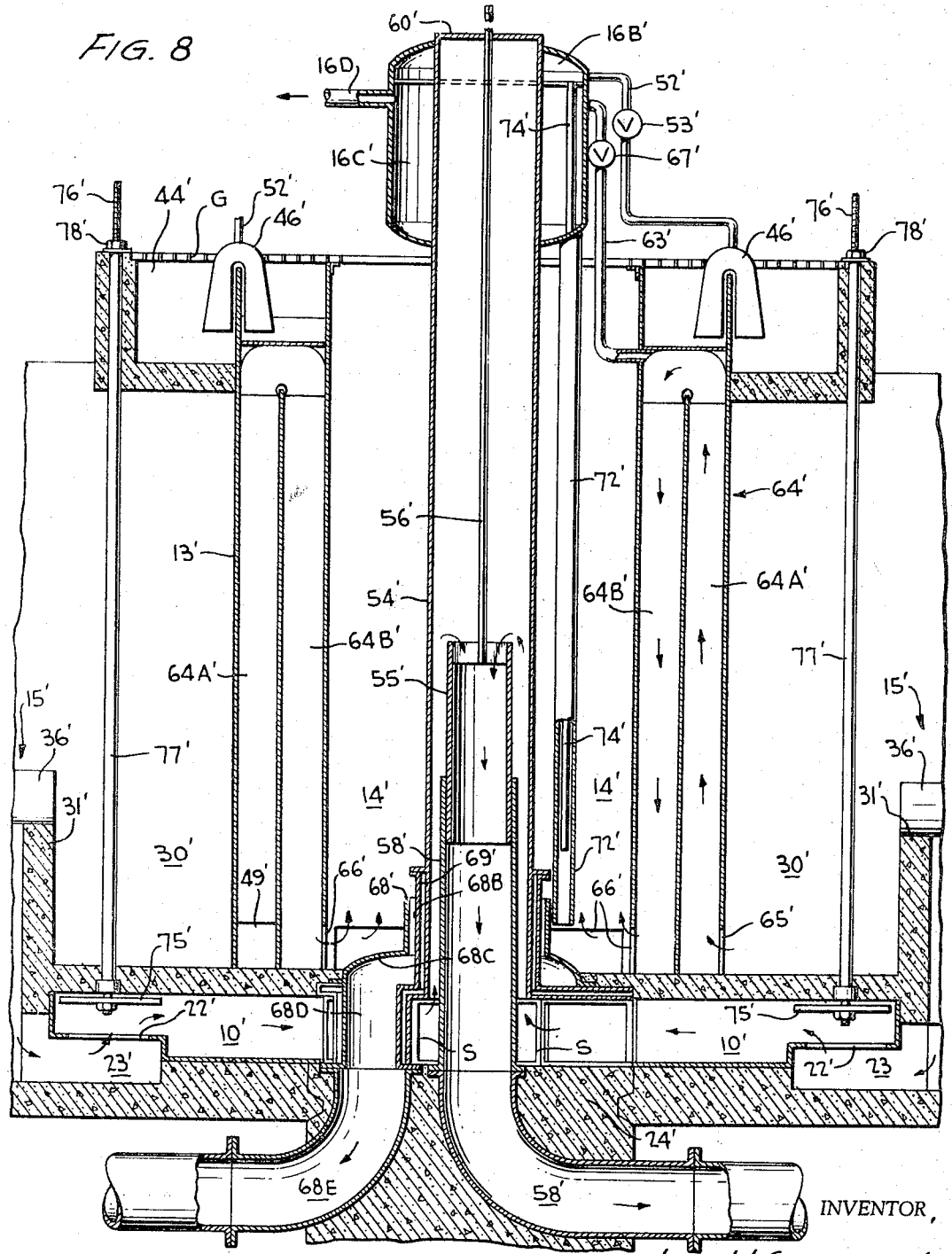

United States Patent Office 3,312,348
Patented Apr. 4, 1967

3,312,348
MULTIPLE UNIT BACKWASHING GRAVITY
FLOW FILTER
John W. Greenleaf, Jr., Coral Gables, Fla., assignor to Greenleaf Enterprises, Inc., Miami, Fla., a corporation of Florida
Filed Oct. 31, 1963, Ser. No. 320,485
16 Claims. (Cl. 210—264)

This invention relates to improvements in a multiple unit backwashing gravity flow filter of the class exemplified in my copending application Ser. No. 259,452, filed Feb. 18, 1963, in which any selected one or more of a battery of filter units may be backwashed while the remaining units of the battery are maintained in operation to maintain a supply of filtered liquid at the necessary head for carrying out the backwashing operation.

In such filters it has heretofore been necessary to store a supply of backwashing liquid at an elevated level above the minimum backwashing level within the filtering units in order to produce by gravity an upward flow of water through the bed of the particular unit or units being backwashed. This in turn has required a raised tank or reservoir generally displaced to one lateral side of the filter units together with means for maintaining the entire body of liquid within the said reservoir at a level well above the backwashing level of the respective filter units in order to provide a gravity backwashing flow through the units.

By the present invention it has been found possible to store the backwashing liquid in a reservoir, the main body of which is enclosed and disposed below the minimum or backwashing level of liquid in the respective filter units, while providing a sufficient head of water for backwashing, by means of a standpipe which may be of quite small cross sectional size to occupy a minimum of space in plan. This permits the centralized location of the backwash liquid reservoir with respect to the several filter units and at a level to communicate directly with each of the said units without the intervention of pipes or conduits.

Reliance upon such a small cross section standpipe for providing the necessary head of liquid for backwashing purposes might normally be questioned on the basis that such a standpipe would not contain sufficient volume of liquid for backwashing. However, the volume of water in the standpipe, in accordance with the present invention, is of no consequence inasmuch as the filtered liquid supply for backwashing purposes is derived from a plurality of the units which are kept in operation during the backwashing of a given unit or units and which supply filtered liquid at a rate at least equal to the rate of withdrawal of liquid for backwashing purposes.

It is an important feature of the invention that, by virtue of its central location and its low level, such a reservoir may communicate through separate ports with each of the filter units, whereby closing of the port for any unit may isolate that unit from the other units of the battery or group during cleaning or repairs, so as to prevent contamination of the filtered liquid supply.

It is a further important feature of the invention to assemble the reservoir and a generally tubular hollow wall control core in vertically superposed relation to occupy minimum area in a completed installation, while still providing direct communication of the reservoir and the control core or unit at the proper levels respectively with the surrounding filter units.

Above all, the foregoing arrangement of elements makes it possible to prefabricate in a single unitary structure the basic operating and backwashing controls for a multiple unit backwashing gravity filter, so that the structures, after being preassembled at a central location may be readily transportable to desired sites at which it is necessary only to erect the surrounding filter units themselves in order to provide a completely operative multiple unit filter.

In the accompanying drawings there is illustrated a preferred form of the invention, it being realized that the invention may assume other and different forms which however embody the same inventive concept. In the said drawings:

FIGURE 3 is an enlarged vertical cross sectional view on the line 3—3 of FIGURE 5.

FIGURE 4 is a plan view on the line 4—4 of FIGURE 3.

FIGURE 5 is a cross section on the line 5—5 of FIGURE 3.

FIGURE 6 is a greatly enlarged fragmentary section taken approximately on the line 6—6 of FIGURE 4.

FIGURE 7 is an enlarged fragmentary elevational view of a portion of the hollow walled tubular core member or structure showing in dotted lines the arrangement therein of one of the backwashing siphons together with the influent supply passage for a given filter unit.

FIGURE 8 is an enlarged fragmentary vertical section, similar to FIGURE 3, showing a modified embodiment of the invention.

Figure 2:
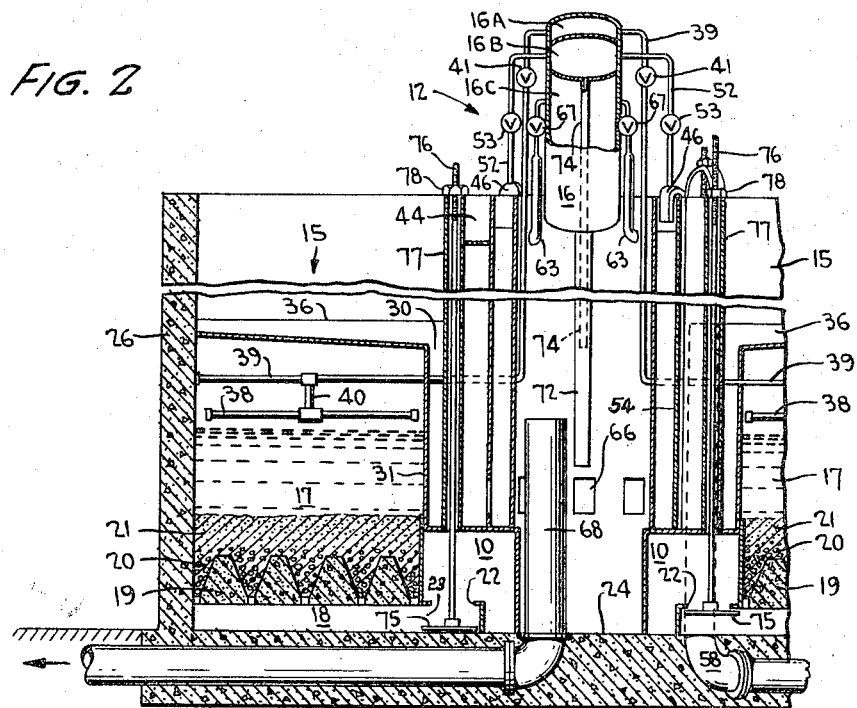
FIGURE 2 is a fragmentary cross section on the line 2—2 of FIGURE 1.

Referring now in detail to the accompanying drawings, and first referring generally to the several major elements or components of the invention as shown, for instance, in FIGURES 2 and 3, the numeral 10 designates generally the centrally located filtered liquid reservoir through which the filtered effluent from all filter units passes on its way to a suitable storage tank or point of use. This reservoir is adapted to entrap and maintain a supply of filtered liquid effluent at a predetermined head for backwashing purposes as hereinafter described.

Supported in vertically superposed and centered relation on the reservoir 10 is a control core 12 comprising an upright tubular wall structure, the interior of which defines a backwash chamber or drain 14 into and through which waste water is delivered and discharged after being employed for backwashing of the various filter units. The core further includes the various conduits or passages for controlling the filtering and backwashing functions of their respective filter units, as will hereinafter appear. Where, as in the preferred embodiment, the backwashing flow and also the flow of influent is controlled by siphons, it is desirable to provide a compartmented tank 16 centrally located in the upper end of the tubular wall structure 13 by its various pipe connections as shown. Certain of the compartments of the tank may be partially evacuated and maintained by suitable means in their partially evacuated state to act as sources of reduced pressure to be placed selectively in communication with the respective siphons in order to prime them, as hereinafter described.

A plurality of generally conventional filter units, each designated 15, encircles the centrally located reservoir 10 and control core 12. Each such unit 15 is divided into upper and lower compartments 17 and 18 respectively, by a horizontally disposed filter bed of conventional construction exemplified by the relatively spaced grating members 19 on which is supported a lowermost layer of graded gravel 20 and an upper layer of sand 21.

The lower compartment 18 of each filter unit 15 communicates directly with the reservoir 10 through a vertically opening port 22 and radial passage 23 to permit the passage of filtered water into the reservoir and also to permit a backwash flow of water from the reservoir 10 upwardly through the filter bed 19, 20, 21. It will be understood that influent is delivered into the upper compartment 17 of each filter bed so that during the normal filtering operation it will flow downwardly through the filter bed into the lower compartment 18 and thence through passages 23 and ports 22 into reservoir 10.

Now taking up in more detail the construction and relationship of the several components or elements, as will best be seen by reference to FIGURES 2, 3 and 5, the reservoir 10 and its associated control core 12 are preferably supported in centered relation on the horizontal upper surface 24 of a circular concrete slab 25 which also defines the bottoms of the several sector shaped filter units 15 which concentrically encircle the control core and reservoir. The outer periphery of each filter unit 15 is defined by its associated sector of the encircling vertical wall 26 which is supported on the slab 25 concentrically to the core and reservoir, the various filter units being completely separated from each other by radial walls 28. It is of importance to note that the several filter units 15 are completely isolated from each other except for their common communication with the interior of the reservoir 10. Preferably each filter unit is provided with a forebay 30 which is separated from its associated filter bed by an arcuate wall or plate 31 supported between adjoining radial walls 28 in grooves 32, the plates being preferably secured in fluid tight manner in their respective grooves 32 as by caulking 33, all as clearly shown in FIGURE 4 of the drawings.

In accordance with usual practice, the influent liquid to be filtered in the several units 15 will normally be delivered into these filter forebays 30 whereby its turbulence will be permitted to subside before it passes outwardly over the plate 31 and above the filter bed of any given unit. If desired, conventional backwash troughs such as 36 may be employed for usual purposes, as may surface wash elements 38 which are illustrated in FIGURES 1 and 2 in the form of medially pivoted horizontal pipes adapted to spray jets of water in generally opposite directions from their opposite halves whereby to induce rotation of the elements 38 by reaction forces in well-known manner.

Surface wash water is selectively supplied to each of the surface wash elements 38 from a pressurized supply of wash water in compartment 16A of the tank 16, through feeder pipes 39 which communicate coaxially with the respective elements 38 through the hollow shafts 40 on which they are supported for rotation.

A valve such as 41 interposed in each feeder pipe 39 exemplifies a suitable means for selectively controlling the supply of surface wash water for each element 38.

Figure 1:
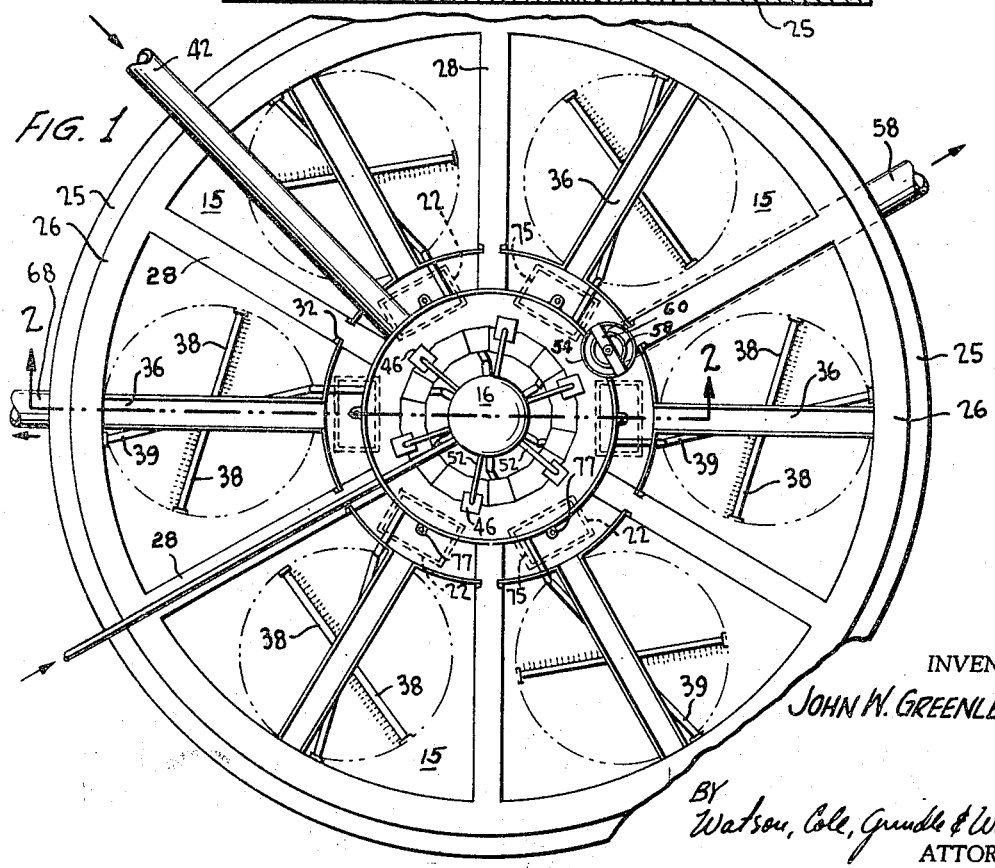
FIGURE 1 is a plan view of a preferred embodiment of a multiple unit gravity backwashing filter in accordance with the invention.

Referring jointly to FIGURES 1, 2 and 7, the influent liquid to be filtered is delivered through an inlet pipe 42 into an annular trough or manifold 44 encircling and supported by the upper end of the tubular wall 13, the said influent liquid being selectively delivered through inlet siphons 46 from the trough 44 into delivery passages or conduits 48 extending downwardly in the present instance between the tubular spaced walls of the tubular wall structure 13 and opening outwardly through ports 49 and 65 into the forebay 30 of the associated filter unit.

It will be seen that the intake end of each siphon 46 is immersed and sealed in the liquid within the trough 44. In order to provide a liquid seal for its discharge end, the discharge end is immersed in a supply of liquid in a trap or liquid seal 50 for escape over a weir 51 into its associated passage 48.

For priming the siphon 46 to institute a flow of influent to its associated filter unit, there is provided a priming pipe or conduit 52 connecting the upper reversely bent portion of the siphon to the partially evacuated compartment 16B of the compartmented tank 16. A manually controllable valve 53, interposed in each such priming pipe 52 is selectively controllable either to prime the siphon by placing it in communication with the partially evacuated compartment 16B, or to discontinue the operation of the siphon by venting it to the atmosphere.

In order to induce a backwashing action in any given filter unit 15, it is necessary to withdraw liquid from the upper compartment of said unit whereby to lower the liquid level in such compartment below the level of the effective head of liquid in the reservoir 10, whereupon the liquid from the reservoir will flow outwardly through its port 22 and passage 23 into the lower compartment 18 then upwardly through the filter beds 19, 20, 21 and into the upper compartment 17.

For maintaining the liquid at the desired predetermined head or effective level in the reservoir 10, the latter is provided with a standpipe 54 which communicates with and projects upwardly from the reservoir with its open upper end disposed substantially above the highest level of liquid likely to be encountered during operation of any of the filter units 15. This standpipe is provided with an overflow outlet which will be at a level appreciably above the backwashing level of the several filter units 15, the backwashing level being the level to which the liquid in a given filter unit must be lowered in order to institute the backwashing operation. In the illustrated structure the minimum backwashing level is determined by the level of the upper edges of the backwashing trough 36 and the associated arcuate plates or partitions 31 which separate the filter forebays from the filter beds. Preferably such an outlet is arranged so that liquid level in reservoir 10 may be varied as desired for various filtering conditions. To this end the outlet in the preferred embodiment (and as shown in FIGURE 3) is defined by an adjustable annular weir or sleeve 55 which is supported at the lower end of an adjusting rod 56 for adjustment in snug telescoping relation in the open upper end of a drain pipe 58 which conveys the filtered effluent to a suitable storage tank or if desired to a point of use.

The upper end of the rod 56 which is threaded is slidably disposed through a bridging piece or bracket 60 supported across the standpipe 54 at its upper end whereby the rod and the annular weir 55 may be vertically adjusted by rotation of the nut 62 threaded onto the rod above the bracket 60.

Thus despite the low level at which the main body of the reservoir 10 is located with respect to the other components of the filter structure, there may be provided a sufficient head of liquid within the reservoir to produce a backwashing action despite the relatively higher backwashing level within the respective filter units. At the same time the location of the reservoir at such a low level makes possible direct communication of its several ports 22 through passages 23 with the lower compartments 18 of the respective filter units without the intervention of pipes or conduits. Moreover, the relatively small diameter of the standpipe 54 makes possible its positioning within the area occupied by the reservoir.

For selectively lowering the liquid level in the upper compartment 17 of a selected filter unit, in order to institute the backwashing of such unit, it is desirable first to discontinue the supply of unfiltered influent to said unit, as by venting its associated inlet siphon 46 through actuation of its control valve 53.

For withdrawing the liquid from the compartment 17 to the desired level to produce the backwashing action, the hollow tubular wall 13 of the filter core is provided with a series of siphons, one for each such unit. As is shown in FIGURE 7, each such siphon has one leg 64A opening outwardly through the port 65 at its lower end into the forebay 30 of its associated filter unit 15, while the lower end of its other leg 64B communicates through an inwardly opening port 66 with the central backwash chamber 14 defined by the tubular wall structure 13. It will be apparent that the liquid normally contained within each forebay 30 will provide a seal for the port 65 of its associated backwash siphon 64. In order to provide a liquid seal for the inwardly opening port 66 of such siphon, the backwashing fluid which is delivered into the chamber 14 through any of the said siphons is normally maintained at a predetermined level above the inwardly opening ports 66 by means such as the drain pipe 68 (FIGURE 2) having its open upper end disposed at the desired level above ports 66, this drain pipe being arranged to convey the backwashing liquid to a suitable disposal point.

The construction and operation of the siphons and the arrangement of the associated passages through the filter core is more fully shown and described in copending application Ser. No. 259,452, filed Feb. 18, 1963.

It will be noted that the inlet passage 48 for each filter unit communicates through the lower end of siphon leg 64A and thence through the port 65 of said leg with its associated filter forebay 30. This is merely to most advantageously utilize the rather limited space available for such outlet port or ports.

In order to control the operation of the respective backwash siphons 64 each such siphon is connected by a conduit 63, having a control valve 67 interposed therein, to a partially evacuated compartment 16C of the compartmented tank 16. The valves 67 are similar to the valves 53 in that each such valve 67 may be manually controlled to establish communication of its respective siphon with the partially evacuated compartment 16C whereby to prime its siphon and thus initiate the backwashing action. Alternatively, it may vent its respective siphon by placing same in communication with the atmosphere to thereby discontinue its operation, with consequent discontinuance of the backwashing operation.

It will be understood that the several units 15 all communicate with the common reservoir 10 but otherwise are completely isolated from each other. Accordingly it is made possible by the provision of suitable valves 75 to selectively close off and isolate any given unit from the reservoir and the other units in order to prevent contamination of the filtered liquid where it is desired to shut off a particular unit for cleaning or repairs. In the present instance, it will be seen in FIGURES 3 and 6, that each valve 75 is in the form of a valve plate carried by a stem 76 guided for vertical movement in an upwardly opening pipe 77, the lower end of which communicates in fluid tight relation with the reservoir 10. A nut 78 threaded onto the upper end of each such valve stem in abutment with the upper end of the guide pipe 77 provides means for opening and closing the valve 75 as desired. Rotation of the valve stem with the nut may be prevented in accordance with usual practice, as for instance by means of a cross pin or key 80 extending transversely through each rod with its projecting ends adapted for movement in slots (not shown) or keyway within the guide pipe 77 associated with such stem.

In the operation of the invention, which is believed to be apparent from the foregoing description, during normal operation, the several inlet valves 53 are all positioned to prime their respective siphons 46, whereby to institute and maintain a flow of influent liquid from the annular inlet trough 44 and the associated siphons 46 and inlet passages 48 into the respective filter units 15. The rate of flow of such influent liquid will normally be sufficient to raise the level of liquid above the filter bed of each unit to approximately the level shown on the left-hand side of FIGURE 3, before the rate of flow of the liquid downwardly through the filter bed becomes equal to the inflow rate, whereby to achieve a substantial stabilization of the liquid level. The liquid which is filtered in passing downwardly through the filter bed into the lower compartment 18 of each filter unit then passes through the normally open port 22 into the reservoir 10, thence outwardly through the outlet provided by the adjustable weir 55.

At such time as any given filter becomes so clogged or inefficient that it is desirable to backwash its filter bed, the inlet siphon for that particular unit is vented to the atmosphere by suitable actuation of its control valve 53 to thus discontinue the delivery of influent to the unit. The backwashing siphon 64 for the same unit is then primed by suitable manipulation of its control valve 67 whereby to withdraw fluid from the filter bed into the chamber of drain passage 14 and bring the level of liquid in the unit below that within the reservoir, as determined by its outlet weir 55. Thereafter continued siphoning of liquid from above the filter bed results in a constant backwashing of the filter bed by a reverse flow of filtered liquid from the reservoir 14 outwardly through one of its ports 22 and passages 23 into the lower compartment 18 of the particular unit being backwashed, thence upwardly through the filter bed to compartment 17 and eventually into the backwashing chamber or drain 14 from which the backwashing liquid is eventually discharged through the drain pipe 68.

It will be readily appreciated that the volume of water stored within the standpipe 54 and also within the several guide pipes 77 will be insufficient to effectively backwash a given filter unit. However, this is immaterial inasmuch as during such backwashing of any given unit or units, the remaining units will be maintained in operation, thereby supplying filtered liquid into the reservoir 10 at a rate ample to meet the requirements for such backwashing operation.

It is to be particularly noted that in accordance with the present invention the backwashing reservoir 10, together with the tubular wall structure 14 and its associated compartmented tank 16 and pipes or conduits together with their respective valves and siphons are all adapted for fabrication and assembly as a complete unitary structure which contains all of the controls and passages necessary for a multiple filter structure. By reason of its compactness such a preassembled unit is adapted for shipment to any desired site whereupon it is necessary only to erect filter units themselves around and in operative relation to it.

Figure 9:
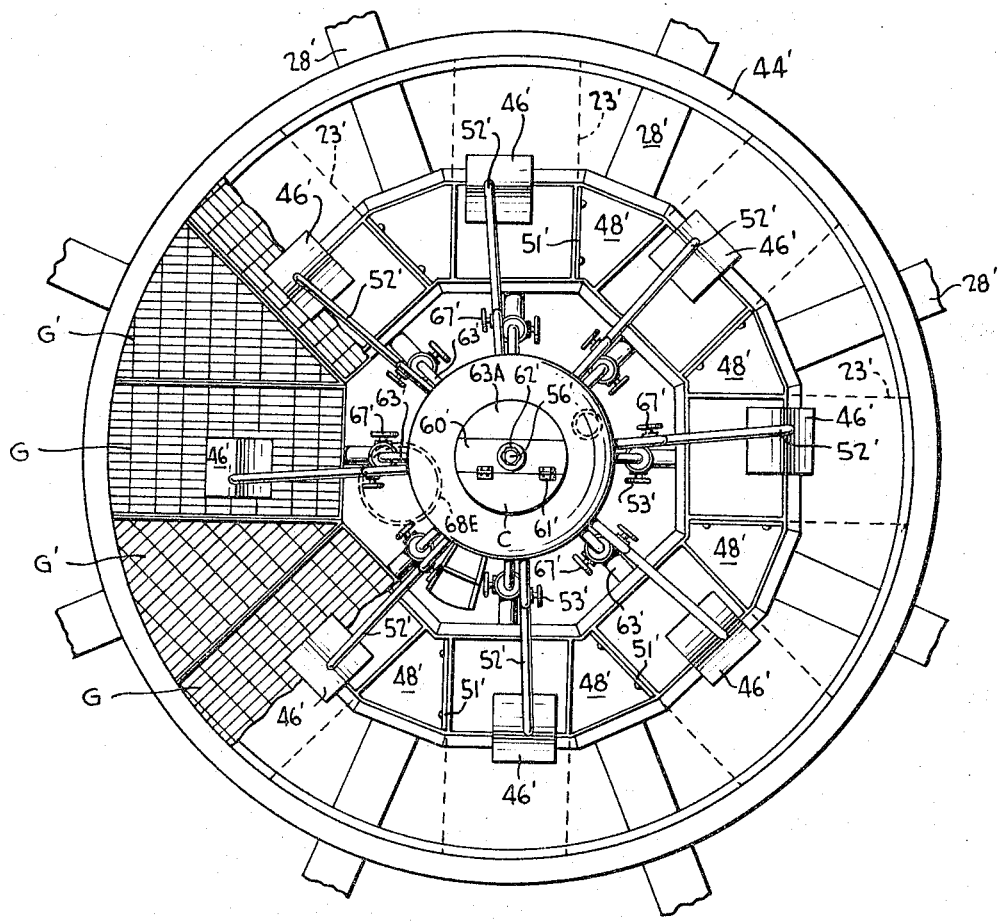
FIGURE 9 is a plan view of the modified structure shown in FIGURE 8, but with the major portion of the walkway defining grate structure broken away.

In the embodiment of the invention shown in FIGURES 8 and 9 of the drawings, the arrangement of parts and their mode of operation are similar to those of the embodiment just described except that certain of the individual parts have been changed and/or relocated to promote compactness of the basic preassembled filter core structure such as will facilitate its shipping and handling, to better insure complete isolation of the filtered liquid from the backwash liquid, and to facilitate inspection and sampling of the filtered liquid as desired.

To promote an understanding of this embodiment, the parts thereof corresponding to those in the embodiment of FIGURES 1 through 7 are designated by corresponding but primed reference characters.

Thus in the modified structure of FIGURES 8 and 9, the standpipe 54' is centered coaxially within the backwash chamber 14' defined by the tubular wall structure 13', and further is utilized as a supporting column for the vacuum tank 16 carried at its upper end. Since in this embodiment the tank 16 does not include a water supply for the surface washing elements such as 38 in the embodiment first described, the tank 16 is accordingly subdivided into but two partially evacuated compartments, namely the low vacuum compartment 16B' and the high vacuum compartment 16C' corresponding respectively to the similarly designated but unprimed components in the first described embodiment. These compartments are connected by conduits 52' and 53' to the siphons 46' and 64' respectively. Valves 53' and 67' in the respective conduits 52' and 63' control the siphons in the identical manner disclosed in the preceding embodiment.

It will be seen that the vacuum tank 16 in this embodiment is of annular configuration with its inner wall defined by the standpipe 54' which projects upwardly through it to permit ready accessibility to the upper end of the weir adjusting stem or control rod 56' which extends through and is slidable within an opening in the cross bar or bracket 60' fixed diametrically across the otherwise open upper end of the standpipe 54. Hingedly connected at 61' to one edge of this bracket 60' is an inspection or cover plate 63' which normally will cover the otherwise open upper end of the standpipe 54' on one side of the bracket 60' whereby opening of the cover plate 63' in obvious manner will permit ready inspection of the filtered water supply within the standpipe 54 and access thereto for the taking of samples as desired. A fixed cover plate 63A may be disposed over the end of the standpipe 54' on the opposite side of the bracket 60'.

The lower end of the standpipe 54' communicates with the reservoir 10' around the drain pipe 58' and is supported on the concrete base 24' by support means S arranged to permit free flow of liquid into and from the lower end of the standpipe 54' from and to the reservoir 10'.

In this form of the invention the drain pipe or overflow outlet 68' from the central backwash chamber 14' is formed to define an annular upwardly opening drain passage 68B encircling the standpipe 54' and in spaced relation thereto leave an air space which is designated 69' in FIGURE 8 to better insure complete isolation of the filtered liquid within the standpipe 54' from the liquid within the backwash chamber 14'. It will be noted that the air space 69' extends substantially above the maximum level of backwash water within the chamber 14', said maximum level being just above the annular overflow passage 68B. A radially enlarged portion 68C of the drain pipe 68' establishes communication between the overflow passage 68B and a discharge outlet 68D which is coupled to the conduit 68E.

As will be seen in FIGURE 8, the outer wall and bottom of the inlet trough 44' of the present embodiment are formed of concrete, while its inner wall is defined by the outer surface of the tubular wall 13' which is enclosed by and supports the concrete portion of the trough 44', the radially inner edge of said concrete portion being in sealing relation with the outer surface of the tubular wall 13'. Also the valve stems 76' for the respective valves 75' are guided for vertical adjustment through the concrete outer wall or trough 44'. The partitions 31' likewise comprise concrete walls in this embodiment.

A further desirable feature of the present embodiment consists in the provision of the removable grate sections G and G' of rectangular and substantially triangular configuration respectively which are removably supported on the upper end edges of the trough and the tubular wall 13' as shown in FIGURE 8 to jointly define an annular walkway around the standpipe 54' and the vacuum tank 16' at a level to permit a workman to have ready access to the siphon control valves 53' and 67' and the adjusting rod or stem 56' for the filtered water control weir 55'.

It is to be understood that in the presently modified embodiment of the invention as well as in the embodiment initially described, both the high vacuum and low vacuum compartments 16C' and 16B' in the instant embodiment will be maintained in a partially evacuated condition by conventional means such as a suction pump or the like (not shown) withdrawing air from the high vacuum compartment 16C' through the suction pipe 16D, together with suitable pressure regulating means for controlling the pump to maintain in said chamber 16C' a substantially constant negative pressure sufficient to actuate the backwash siphons 64' but insufficient to flood the compartment 16C'.

A portion of the negative pressure within the compartment 16C' is transmitted to and maintained within the low vacuum compartment 16B', preferably by means and in the manner disclosed in my copending application Ser. No. 259,452, filed Feb. 18, 1963. Accordingly the pipe 72' opening into chamber 16C' has its open lower end disposed at a level below the upper edge of pipe or fitting 68', and thus normally below the liquid level within the backwash chamber 14'. Thus the suction transmitted through pipe 72' from the compartment 16C' will raise a column of liquid within the said pipe to a level above the depending lower open end of pipe 74'. The latter pipe 74' communicates with the low vacuum chamber 16B' and transmits to that chamber the particular degree of vacuum or negative pressure existing at the level of its lower end within the pipe 72'. Thus the level to which the free lower end of the pipe 74' depends beneath the upper surface of the column of water surrounding it within the relatively larger pipe 72' will determine the relative negative pressures as between the two tank compartments 16B' and 16C'.

In the present application I have shown and described only the preferred embodiment of the invention together with a single modification thereof, simply by way of illustration of the preferred mode of carrying out the invention. However, I recognize that the invention is capable of still further and different embodiments and that its several details may be modified in various ways all without departing from my invention as defined in the accompanying claims.

Having thus described my invention, I claim:

1. A multiple unit gravity backwashing filter comprising a filtered water reservoir having a plurality of separate inlet ports for filtered liquid and a common outlet controlled by an outlet weir for maintaining a constant predetermined level of liquid in said reservoir and for permitting the escape of excess liquid at all times from the reservoir, a backwash effluent liquid chamber supported on and above said reservoir, a multiplicity of relatively isolated filter units surrounding said reservoir, each said unit comprising a horizontal filter bed, said reservoir ports communicating with the respective said units at a level beneath the filter beds thereof and being open to permit free bi-directional flow of liquid therethrough both into and from the reservoir solely in accordance with changes in the levels of liquid in the respective units, in combination with influent supply means normally delivering influent liquid to said units above their respective filter beds at a sufficient rate to maintain the level of liquid over said beds appreciably higher than said level of liquid in the reservoir, and selectively controllable means including fluid conduits communicating with said chamber and with each of said units at a level above the respective filter beds and below the said liquid level within the reservoir for withdrawing liquid from above the filter bed of a given unit to a level below said pre-determined level within the reservoir to establish a gravity backwashing flow of liquid from the reservoir upwardly through the bed of said unit only, while permitting the remaining units to supply liquid to said reservoir and also to remove backwash effluent liquid from said given unit.

2. A multiple unit gravity backwashing filter as defined in claim 1, including means for separately and independently closing each said port to isolate its respective unit from the other units and from said reservoir.

3. A multiple unit gravity backwashing filter as defined in claim 1, in which said selectively controllable means comprises siphons each communicating with said chamber and with one of said filter units, means defining water seals for the respective siphons within said chamber, and means for selectively priming and venting the respective siphons.

4. A multiple unit gravity backwashing filter comprising a filtered water reservoir having a plurality of separate inlet ports for filtered liquid and a common outlet controlled by an outlet weir for maintaining a constant predetermined level of liquid in said reservoir, a backwash effluent liquid chamber supported on and above said reservoir, a multiplicity of relatively isolated filter units surrounding said reservoir, each said unit comprising a horizontal filter bed, said reservoir ports communicating with the respective said units at a level beneath the filter beds thereof, in combination with influent supply means normally delivering influent liquid to said units above their respective filter beds at a sufficient rate to maintain the level of liquid over said beds appreciably higher than said level of liquid in the reservoir, and selectively controllable means including fluid conduits communicating with said chamber and said units at a level above the respective filter beds and below the said liquid level within the reservoir for withdrawing liquid from above the filter bed of a given unit and thereby lowering the liquid level above said bed to establish a gravity backwashing flow of liquid from the reservoir upwardly through the bed and also to remove backwash effluent liquid from said given unit, said filter further including a standpipe projecting upwardly from said reservoir and communicating with its interior, and an overflow pipe disposed concentrically within and spaced from said standpipe, said overflow pipe extending downwardly in fluid tight relation through the bottom of the reservoir and having an open upper end defining the said outlet.

5. The combination of claim 4, in which said overflow pipe includes a vertically adjustable sleeve-like weir telescopically associated therewith at its upper outlet end, the said weir defining the outlet, a control rod operatively connected to said weir and projecting through the upper end of said standpipe, a bracket on said upper end slidably receiving said rod and threaded means on said rod abutting against said bracket for effecting vertical adjustment of the rod and weir.

6. A multiple unit gravity backwashing filter comprising a vertical tubular wall for enclosing and defining a central backwash chamber having an outlet for discharge of backwash liquid, a filtered liquid reservoir disposed beneath said tubular wall, a standpipe communicating with and projecting upwardly from said reservoir, said standpipe having an overflow outlet for maintaining the liquid in said standpipe at a predetermined level, a plurality of filter units encircling said chamber and said reservoir, each unit including a horizontal filter bed dividing it into upper and lower compartments, selectively controllable means for normally supplying influent liquid into the said upper compartments to an operative filtering level appreciably above said predetermined level of liquid in the reservoir, said reservoir normally communicating through separate ports with the lower compartment of each said unit, said tubular wall being formed to define passages establishing communication between said backwash chamber and each said upper compartment, and means for selectively controlling the flow of liquid through said passages, said passages opening into said chamber and said compartments below the said level of the overflow outlet.

7. The structure defined in claim 6, in which said passages are siphon passages, and said flow controlling means comprises means for selectively priming and venting the respective passages.

8. A multiple unit gravity backwashing filter as defined in claim 6, including valves operatively associated with the respective ports in controlling relation thereto and valve stems supporting the respective valves, together with a pipe projecting upwardly from the reservoir and in fluid tight communication therewith at its lower end, each said pipe slidably receiving and guiding one of said valve stems, and threaded means at the upper end of each said pipe for adjusting the vertical position of each said stem and its associated valve.

9. The combination as defined in claim 6, in which said plurality of filter units includes a common horizontal bottom, said reservoir and tubular wall being supported on said bottom concentrically to the said encircling units, with the bottoms of said lower compartments and of said reservoir at a common horizontal level.

10. In a multiple unit gravity backwashing filter, a retention reservoir for maintenance of a constant predetermined head of filter liquid for backwashing purposes, said reservoir being of generally circular configuration in plan and being provided with a plurality of vertically directed ports and radially outwardly opening passages for placing said ports in communication with the respective filter units, valve rods disposed for vertical movement in alignment with their respective ports in fluid tight relation through the said reservoir, a valve carried by each said rod for movement into and from closing relation with respect to its associated port, means for thus moving each said valve rod, a vertical standpipe communicating with said reservoir and projecting upwardly therefrom, a vertical overflow pipe extending in fluid tight relation completely through said reservoir, and upwardly into said standpipe in radially spaced relation therefrom, said overflow pipe having an outlet opening determining the level of liquid within said standpipe, a weir sleeve telescopically associated with the upper end of said overflow pipe and defining the said outlet opening, a control rod connected to said weir sleeve and extending upwardly through the open upper end of said standpipe, and means at the upper end of said standpipe for vertically moving said control rod and weir.

11. A multiple unit gravity backwashing filter comprising a vertical tubular wall of generally cylindrical configuration enclosing and defining a central backwash effluent liquid chamber, a filtered liquid reservoir of generally annular configuration and of larger external diameter than the wall disposed beneath and supporting said tubular wall and having a portion projecting radially outwardly beyond said wall, a standpipe communicating with and projecting upwardly from the said outwardly projecting portion of the reservoir outside of said wall, said standpipe having an overflow outlet positioned to maintain a supply of filtered liquid in said standpipe at a predetermined level, the central opening of said annular reservoir defining a continuation of said backwash chamber, drainage means for said chamber extending downwardly through said opening, a plurality of filter units encircling said chamber and said reservoir, each unit including a horizontal filter bed dividing it into upper and lower compartments, selectively controllable means for normally supplying influent liquid to said upper compartments of the respective filters to an operative filtering level above said predetermined level of liquid within the reservoir, the bottoms of said lower compartments and said reservoir being at a common level, said reservoir normally communicating through separate ports with the lower compartment of each said unit, and said tubular wall being formed with passages for establishing communication between said backwash effluent liquid chamber and each said upper compartment, said passages opening into said chamber and said compartments appreciably below the said predetermined level of liquid within the reservoir.

12. In a multiple unit gravity backwashing filter, a retention reservoir for maintenance of a constant predetermined head of filtered liquid for backwashing purposes, said reservoir having a generally circular configuration in plan and being provided with a plurality of vertically directed ports and radially outwardly opening passages for placing said ports in communication with the respective filter units, valves respectively disposed in controlling relation to the said ports and means for selectively actuating each of said valves, a vertical standpipe concentrically disposed within said reservoir in fluid tight relation thereto and projecting upwardly therefrom, a vertical overflow pipe extending in fluid tight relation to the bottom of said reservoir and projecting upwardly into said standpipe in radially spaced relation therefrom, said overflow pipe having an outlet opening determining the level of liquid within said standpipe, a weir sleeve telescopically associated with said overflow pipe and defining the said outlet opening, and means accessible at the upper end of said standpipe for vertically adjusting said weir sleeve.

13. A multiple unit gravity backwashing filter comprising a vertical tubular wall for enclosing and defining a central backwash chamber having an outlet for discharge of backwash liquid, a filtered liquid reservoir disposed beneath said tubular wall and isolated from said backwash chamber, a vertical standpipe within and encircled by said tubular wall with its lower end in communication with said reservoir, said standpipe having means defining an overflow outlet therein for maintaining the liquid in said standpipe at a predetermined level, a plurality of filter units encircling said chamber and said reservoir, each unit including a horizontal filter bed dividing it into upper and lower compartments, selectively controllable means for supplying influent into the said upper compartments to an operative filtering level appreciably above said predetermined level of liquid in the reservoir, said reservoir normally communicating through separate ports with the lower compartment of each said unit, said tubular wall being formed to define siphon passages for establishing communication between said backwash chamber and each said upper compartment, means for supplying unfiltered influent liquid to the respective upper compartments of the said units, and means for selectively priming and venting the respective siphon passages.

14. A multiple unit gravity backwashing filter as defined in claim 13 wherein said means for selectively priming and venting the respective siphon passages comprises a vacuum tank supported by and at the upper end of said standpipe and concentrically encircling the latter with said upper end opening above the vacuum tank, conduits connecting the respective siphon passages with said tank, and valves associated with the respective conduits for selectively establishing communication of any given passage with the said tank.

15. A multiple unit gravity backwashing filter as defined in claim 13 wherein said outlet for discharge of backwash liquid includes means defining an annular passage encircling said standpipe at a predetermined level within said backwash chamber.

16. The combination of elements defined in claim 15 further including means defining an annular air chamber disposed between and concentrically to said standpipe and said annular intake passage.

References Cited by the Examiner
UNITED STATES PATENTS

| | | | |
|---|---|---|---|
| 630,988 | 8/1899 | Reisert | 210—108 |
| 2,084,659 | 6/1937 | Streander | 210—275 X |
| 2,395,508 | 2/1946 | Seddig | 210—264 |
| 2,879,893 | 3/1959 | Stebbins | 210—108 |

FOREIGN PATENTS 19,220 of 1890 Great Britain.

REUBEN FRIEDMAN, *Primary Examiner.*

D. M. RIESS, *Assistant Examiner.*